UNITED STATES PATENT OFFICE.

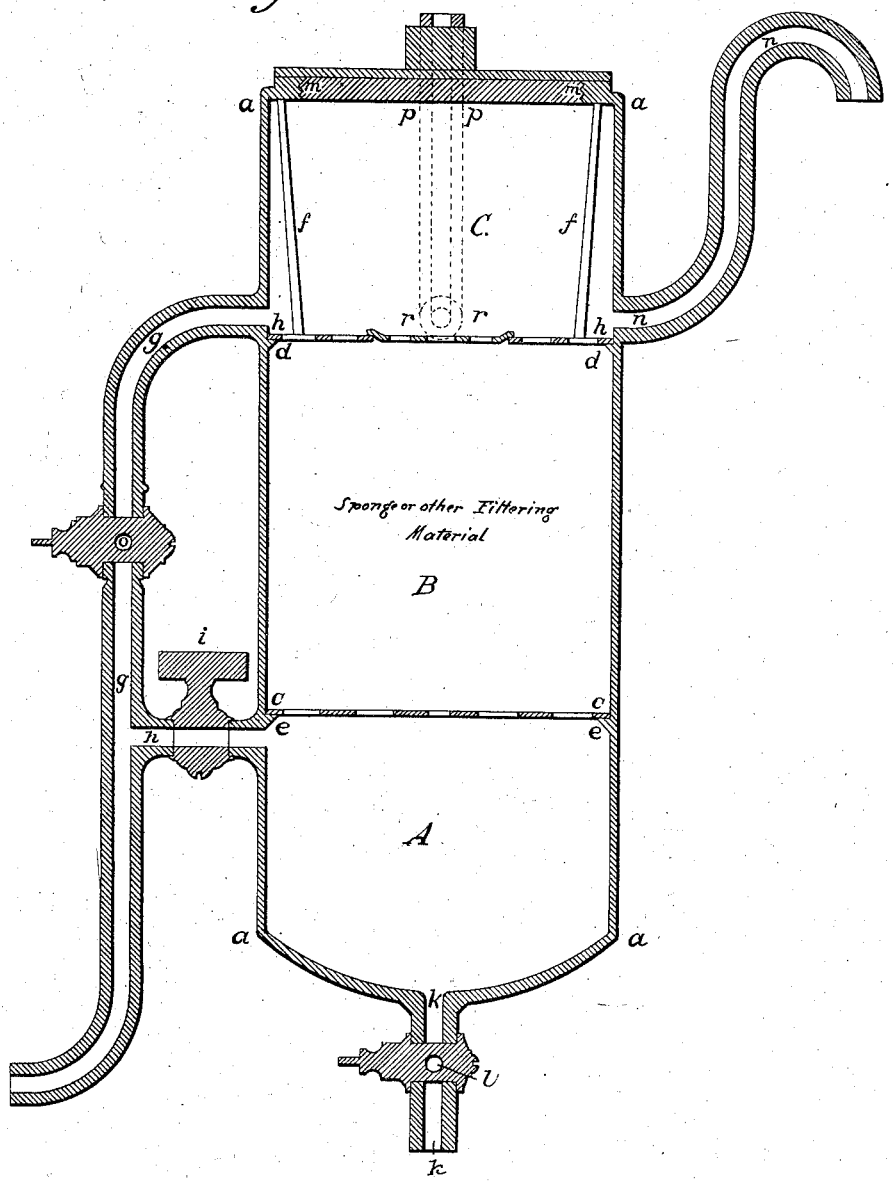

JNO. H. THORNDIKE, OF BOSTON, MASSACHUSETTS.

CONSTRUCTION OF SUPPLY-PIPES FOR AQUEDUCTS.

Specification of Letters Patent No. 3,650, dated July 1, 1844.

*To all whom it may concern:*

Be it known that I, JOHN H. THORNDIKE, of Boston, in the county of Suffolk and State of Massachusetts, have invented a new and useful improvement in the arrangement of delivery or supply pipes of aqueducts, &c., for filtering water from the same, and that the following description, taken in connection with the accompanying drawing hereinafter referred to, forms a full and exact specification of the same, wherein I have set forth the nature and principles of my said improvement by which my invention may be distinguished from others of a similar kind, together with such part or combination as I claim and desire to have secured to me by Letters Patent.

My invention or improvement consists in adapting a cylindrical shaped filtering vessel to the aqueduct delivering or supply pipes in such a way that the "head" or elevation of the water may be availed of, and the water be made to flow to as great a height (after passing through the filter), as it would if said filter were not used, and also in combining with or forming in the upper part of said filter, an air vessel or chamber, when a pump is to be used, which air vessel will materially assist the pump or cause it to work more freely, in raising the water to a greater height than the "head" would carry it.

The accompanying drawing represents my improvement or new invention, the figure being a longitudinal vertical section through the filtering vessel and pipes leading to and from the same.

The filtering vessel or instrument $a\,a\,a\,a$ is as before suggested of a cylindrical shape, and may be made of stone, wood or any suitable metal, it being requisite only to have it sufficiently strong to resist the pressure; the material which I have preferred is copper tinned over on the inside so as not to injure the water. The filtering vessel is divided into three chambers or apartments, (having the relative or proportionate heights shown in the figure), by means of the upper and lower straining plates or gratings $b\,b$, $c\,c$, both of which are supported by the rims shown at $d\,d$, $e\,e$ formed on the inside of the vessel, the upper plate being fastened down by means of the inclined braces $f, f,$ arranged as represented in the drawing. Of these three divisions or apartments, A is the receiving chamber into which the water first comes from the aqueduct discharging or supply pipe $g\,g\,g$; the water being delivered through the short cross pipe $h$, which opens into the chamber A just below the straining plate $c\,c$, and is provided with a proper stopcock at $i$ which is represented as open. From the bottom of this chamber it will be seen that a pipe $k\,k$ descends which should connect with the drain the purpose of which will be mentioned in the sequel; this pipe also has a stop cock $l$ which is represented as closed.

The division of the filtering vessel, directly above that just described is the filtering chamber B, which comprises the space between the two strainers $b\,b$, $c\,c$, and should be filled with the desired filtering material or substances. That which I have found sufficient to intercept all perceptible impurities is sponge, which should be closely packed in the said chamber. The division above the strainer $b\,b$ is the air chamber C, comprising the space between the upper side of said strainer and the top plate $m\,m$ of the filtering vessel. This plate should be made of composition metal and so fitted as to be made to screw air tight with the top of the filter, the object of said plate so arranged being to render the interior of the filter accessible to the hand when desirable.

The delivering pipe $n\,n$, for filtered water, opens from the chamber C just above the top of the strainer $b\,b$ and directly opposite to the mouth of this pipe enters the mouth of the aqueduct supply pipe $g\,g\,g$, which is continued up above the cross pipe $h$, and has a suitable stop cock at $o$, which is represented as closed. The object of this arrangement of the pipe $g\,g\,g$ is to carry off the impurities which may have collected in the receiving chamber A or the lower part of the filtering chamber B. This is done by closing the stop cock $i$ in the pipe $h$ and opening that at $o$ in the pipe $g\,g\,g$, which will cause the water to rise in the pipe $g\,g\,g$ and flow into the air chamber C and pass down into the chamber A, and from thence (carrying with it all impurities and solid substances), through the drain pipe $k\,k$ into the drain, the stop cock at $l$ being opened for the purpose.

The bottom of a pump pipe may open into the air chamber C just above the top of the strainer $b\,b$ as shown by dotted lines in the figure at $p\,p\,p\,p$, by which arrangement the water may be raised to a greater height than its "head" would naturally carry it. It will be seen that the air chamber C is a kind of reservoir or cistern for the pump, into which the water is constantly running during the operation of the pump, and the compression of the air consequent upon the rising of the water as aforesaid in the chamber C operating by its elasticity upon the water prevents the formation of a vacuum in the pump pipe and materially assists the operation of pumping, whereas if the pump pipe were connected directly to the aqueduct delivering pipe the supply of water to the pump would not be ample and the pump would be racked by the jerking &c. of the boxes.

It should be particularly noted that by my improved arrangement the water is filtered without obstructing or checking its tendency to rise by the force of its "head," so that in fact the pipe $n\ n$ from which the filtered water is drawn is but a continuation of the aqueduct delivering pipe $g\ g$, the filtering material or chamber, only intervening or being inserted between the two as hereinabove set forth. I am aware that water has been filtered heretofore by the force of its head and therefore do not lay claim to any such arrangement but I do not believe that a filtering vessel has ever been combined with aqueduct pipes so that the head may be availed of and therefore my claim will be confined to a combination ts hereinafter set forth.

Having thus described my invention I shall state my claim as follows:

I claim the combination with the three apartments A, B, C of the filtering apparatus of the three pipes $g\ g\ g$, $h$ and $k\ k$ in the manner and for the purpose described.

In testimony that the foregoing is a true description of my said invention and improvement I have hereto set my signature this nineteenth day of March in the year eighteen hundred and forty four.

JOHN H. THORNDIKE.

Witnesses:
　JAS. B. ROBB,
　EZRA LINCOLN, Jr.